April 16, 1963  D. B. BREEDON ETAL  3,086,162
CONTROL APPARATUS

Original Filed Aug. 30, 1957  3 Sheets-Sheet 2

WITNESSES
John E. Headley Jr.
James F. Young

INVENTORS
David B. Breedon, James T. Carleton
& Raymond W. Ferguson
BY
Clement L. McHale
ATTORNEY

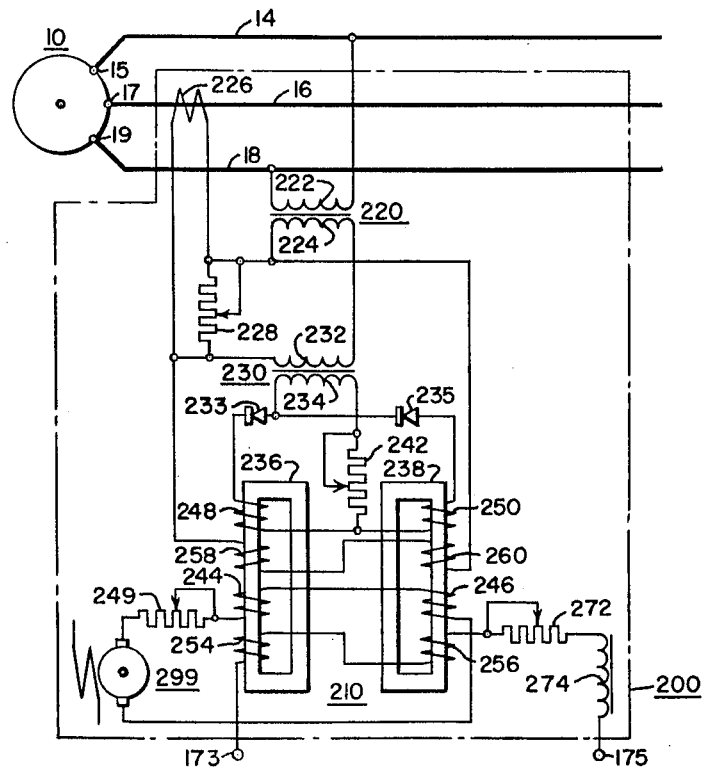
Fig. 6.
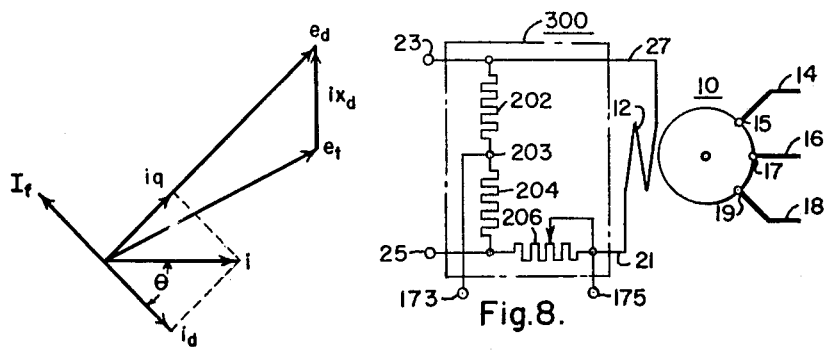
Fig. 7.
Fig. 8.

United States Patent Office 3,086,162
Patented Apr. 16, 1963

3,086,162
CONTROL APPARATUS
David B. Breedon, Forest Hills, Pa., James T. Carleton, Severna Park, Md., and Raymond W. Ferguson, Penn Township, Allegheny County, Pa., assignors to Westinghouse Electric Corporation, East Pittsburgh, Pa., a corporation of Pennsylvania
Original application Aug. 30, 1957, Ser. No. 681,214, now Patent No. 2,979,652, dated Apr. 11, 1961. Divided and this application June 22, 1960, Ser. No. 37,938
5 Claims. (Cl. 322—25)

This invention relates to electrical control apparatus, and more particularly to regulator systems.

The present application is a divisional application of our copending application, Serial No. 681,214 now U.S. Patent 2,979,652 which was filed August 30, 1957, and which is assigned to the same assignee as the present application.

A problem of hunting arises in the operation of any synchronous machine in certain regions of loading, primarily when the field of the machine is weakened. Although the use of continuously acting regulators greatly extends the operating range of a synchronous machine as generally employed, the use of a continuously acting regulator increases the hunting problem. This disadvantage of the continuously acting regulator can be overcome by introducing energy into the field of a synchronous machine at the proper time during the hunting cycle. It has been found that a damping signal which is proportional to the derivative of the field current or the direct axis component of the armature current of a synchronous machine can be fed into a regulator system to prevent hunting of a synchronous machine when the field of the machine is weakened. When the proper constants are selected for the damping circuit, hunting can be substantially eliminated over the entire range of dynamic stability.

An object of this invention is to provide a new and improved electric control system.

Another object of this invention is to provide a new and improved means for preventing hunting of a regulator system.

A more specific object of this invention is to provide a damping circuit for a regulator system used to control the excitation current of a dynamoelectric machine in which the damping signal varies with the derivative of the excitation current.

Other objects of the invention will in part be obvious and will in part appear hereinafter.

For a fuller understanding of the nature and objects of the invention, reference should be had to the following detailed description taken in connection with the accompanying drawings, in which:

FIG. 6 is a partial schematic diagram of circuits and apparatus illustrating a fourth embodiment of this invention;

FIG. 7 is a vector diagram illustrating some of the currents and voltages obtained in the damping circuit illustrated in FIG. 6; and FIG. 8 is a partial schematic diagram of circuits and apparatus illustrating a fifth embodiment of this invention.

Figure 1:
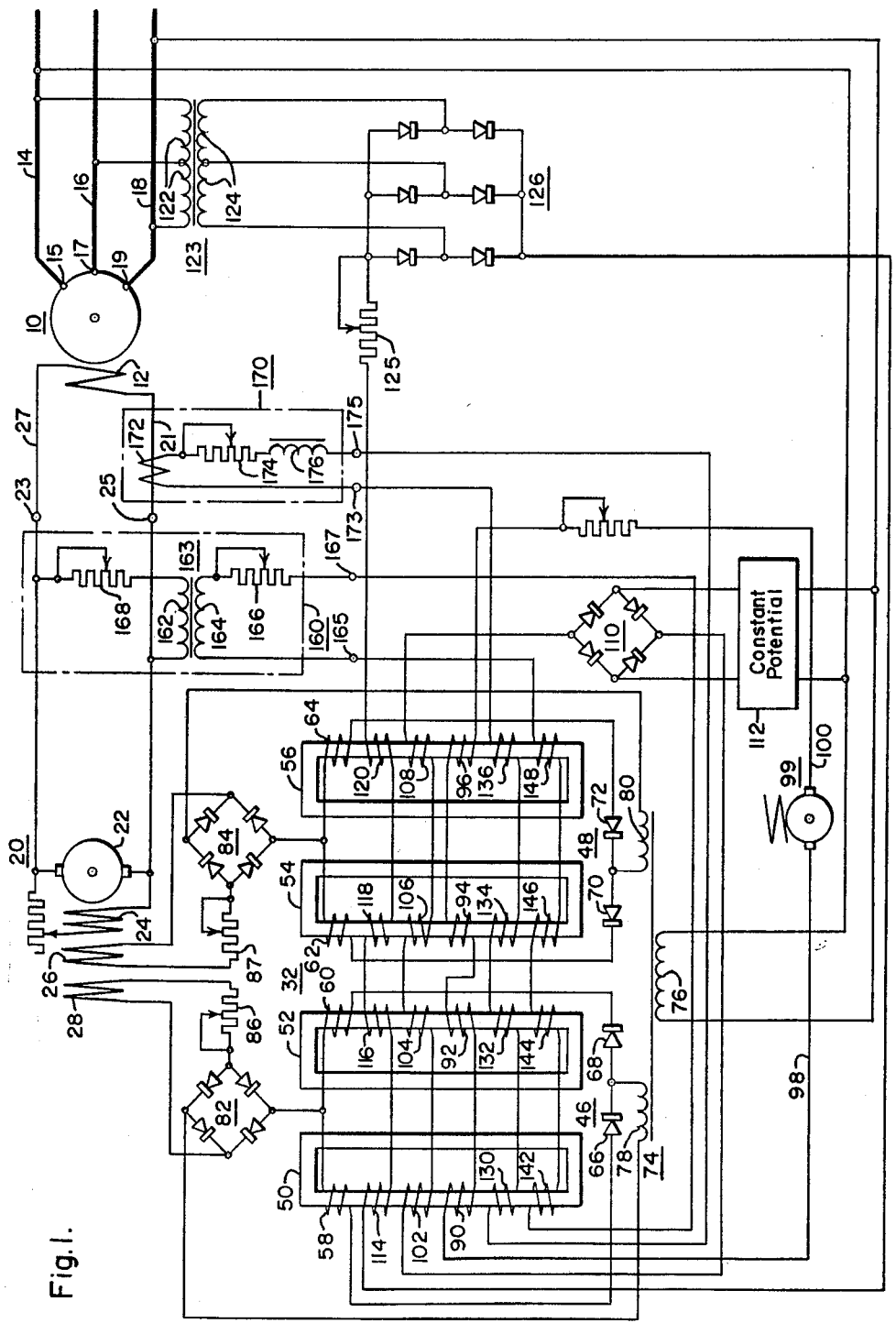
FIGURE 1 is a schematic diagram of circuits and apparatus illustrating one embodiment of the teachings of this invention.

Referring now to the drawings, and FIG. 1 in particular, there is illustrated a dynamoelectric machine, specifically a synchronous generator 10 having a field winding 12. In this instance, the generator 10 is disposed to supply energy through its output terminals 15, 17 and 19 to the line conductors 14, 16 and 18 which are part of a three-phase electrical system. In order to obtain an excitation voltage across the field winding 12 of relatively large magnitude, an exciter 20 is provided. In this instance, the exciter 20 comprises an armature 22 which supplies current at the terminals 23 and 25 which flows through the conductors 21 and 27 to the field winding 12 of the generator 10, a self-exciting winding 24 which is connected in shunt with the armature 22, and the buck and boost field windings 26 and 28, respectively, the purpose of which will be explained hereinafter. In order to maintain the output voltage of the generator 10 at substantially a predetermined value, a regulator loop 30 comprising a push-pull magnetic amplifier 32 is interconnected between the output of the generator 10 and the buck and boost field windings 26 and 28 of the exciter 20.

In accordance with the teachings of this invention, first and second damping circuits 160 and 170, respectively, are connected in circuit relationship with the field winding 12 of the generator 10 and cooperate with the push-pull magnetic amplifier 32 of the regulator loop 30 to prevent hunting of the generator 10 when the field of the generator 10 is weakened. In general, the first damping circuit 160 applies a damping signal, which varies with the negative derivative of the voltage across the field winding 12, to the magnetic amplifier 32.

As hereinbefore mentioned, the regulator loop 30 is provided in order to maintain the magnitude of the output voltage of the generator 10 at substantially a predetermined value. For purposes of clarity, the components and operation of the regulator loop 30 will be described before describing the various components and operation of the first and second damping circuits 160 and 170.

As illustrated, the push-pull magnetic amplifier 32 is of standard construction and comprises two main sections 46 and 48. The section 46 comprises two magnetic core members 50 and 52, and the section 48 comprises two magnetic core members 54 and 56. In this instance, load windings 58, 60, 62 and 64 are disposed in inductive relationship with the magnetic core members 50, 52, 54 and 56, respectively. As is customary, self-saturation for the magnetic amplifier 32 is obtained by connecting in series circuit relationship with the load windings 58, 60, 62 and 64, self-saturating rectifiers 66, 68 and 70 and 72, respectively.

In order to form a doubler circuit of the section 46, the series circuit including the load winding 58 and the self-saturating rectifier 66 is connected in parallel circuit relationship with the series circuit including the load winding 60 and the self-saturating rectifier 68. Likewise, in order to form a doubler circuit of the section 48, the series circuit including the load winding 62 and the self-saturating rectifier 70 is connected in parallel circuit relationship with the series circuit including the load windings 64 and the self-saturating rectifier 72.

Energy for the load windings 58, 60, 62 and 64, of the magnetic amplifier 32, is received from a transformer 74 having a primary winding 76, which in this instance is responsive to the output voltage of the generator 10, and secondary winding sections 78 and 80. As illustrated, a full-wave dry-type load rectifier 82 is interconnected with the hereinbefore described parallel circuit of the section 46, and with the secondary winding section 78, of the transformer 74, in order to produce a direct current output for the section 46. In like manner, a full-wave, dry-type load rectifier 84 is interconnected with the hereinbefore described parallel circuit of the section 48, and with the secondary winding section 80, of the transformer 74, in order to obtain a direct-current output for the section 48.

In this instance, the boost field winding 28 of the exciter 20 is responsive to the output of the load rectifier 82, and the buck field winding 26 of the exciter 20 is responsive to the output of the load rectifier 84. In operation, the buck field winding 26 opposes the boost field winding 28. However, in order to obtain a substantially equal and opposite effect, as produced by the buck and boost field windings 26 and 28, when the output voltage of the generator 10 is at its regulated value, the variable resistors 86 and 87 are connected in series circuit relationship with the boost field winding 28 and the buck field winding 26, respectively.

For the purpose of biasing each of the sections 46 and 48 of the magnetic amplifier 32 to approximately half its output, biasing windings 90, 92, 94 and 96 are disposed in inductive relationship with the magnetic core members 50, 52, 54 and 56, respectively. In particular, the biasing windings 90, 92, 94 and 96 are connected in series circuit relationship with one another, the series circuit being connected to conductors 98 and 100 which have applied thereto a substantially constant direct-current voltage from the direct-current source 99. In operation, the current flow through the biasing windings 90, 92, 94 and 96 produces a flux in their respective magnetic core members that opposes the flux produced by the current flow through the load windings 58, 60, 62 and 64, respectively.

In order to obtain a reference point from which to operate in each of the sections 46 and 48 of the magnetic amplifier 32, reference windings 102, 104, 106 and 108 are disposed in inductive relationship with the magnetic core members 50, 52, 54 and 56, respectively. The reference windings 102, 104, 106 and 108 are so disposed on their respective magnetic core members 50, 52, 54 and 56 that the current flow through the reference windings 102 and 104 produces a flux that opposes the flux produced by the respective biasing windings 90 and 92, and that the current flow through the reference windings 106 and 108 produces a flux that is additive to the flux produced by the respective biasing windings 94 and 96. As illustrated, the reference windings 102, 104, 106 and 108 are connected in series circuit relationship with one another, the series circuit being connected to the output terminals of a full-wave dry type rectifier 110. In order that the current flow through the reference windings 102, 104, 106 and 108 remain substantially constant, the input terminals of the rectifier 110 are connected to a constant potential device 112 which produces at its output a substantially constant alternating current voltage irrespective of the magnitude of the output voltage of the generator, to which the constant potential device 112 is responsive.

The control windings 114, 116, 118 and 120 are disposed in inductive relationship with the magnetic core members 50, 52, 54 and 56, respectively. In particular, the control windings 114, 116, 118 and 120 are connected in series circuit relationship with one another, the series circuit being connected to the output terminals of a full-wave dry-type rectifier 126 through a variable resistor 125. The input terminals of the rectifier 126 are connected to the secondary windings 124 of the potential transformers 123. The primary windings 122 of the potential transformers 123 are responsive to the output voltage of the generator 10, being connected to the line conductors 14, 16 and 18. The variable resistor 125 may be used to change the value of the voltage at which the regulator loop 30 maintains the output voltage of the generator 10. The control windings 114, 116, 118 and 120 are so disposed on their respective magnetic core members 50, 52, 54 and 56 that when current flows therethrough, a flux is produced in the respective magnetic core members that opposes the flux produced by the current flow through the respective reference windings 102, 104, 106 and 108.

The damping windings 130, 132, 134 and 136 are disposed in inductive relationship with the magnetic core members 50, 52, 54 and 56, respectively. In particular, the damping windings 130, 132, 134 and 136 are connected in series circuit relationship with one another, the series circuit being connected to the output terminals 173 and 175 of the second damping circuit 170. The damping windings 130, 132, 134 and 136 are so disposed on their respective magnetic core members 50, 52, 54 and 56 that when current flows therethrough a flux is produced in the respective magnetic core members that opposes the flux produced by the current flow through the respective control windings 114, 116, 118 and 120.

The damping windings 142, 144, 146 and 148 are disposed in inductive relationship with the magnetic core members 50, 52, 54 and 56, respectively. In particular, the damping windings 142, 144, 146 and 148 are connected in series circuit relationship with one another, the series circuit being connected to the output terminals 165 and 167 of the first damping circuit 160. The damping windings 142, 144, 146 and 148 are so disposed on the respective magnetic core members 50, 52, 54 and 56, that when the current flows therethrough a flux is produced in the respective magnetic core members that opposes the flux produced by the current flow through the respective control windings 114, 116, 118 and 120.

The operation of the regulator loop 30 will now be described. When the output voltage of the generator 10 increases to a value above its regulated value, the current flow through the control windings 114, 116, 118 and 120 increases to thereby decrease the output current from the section 46 of the magnetic amplifier 32 and increase the output current from the section 48 of the push-pull magnetic amplifier 32. Such an action increases the current flow through the buck field winding 26 and decreases the current flow through the boost field winding 28 to thereby decrease the output voltage of the exciter 20. A decrease in the output voltage of the exciter 20 decreases the magnitude of the voltage across the field winding 12 of the generator 10 to thereby return the output voltage of the generator 10 to its regulated value. On the other hand, a decrease in the output voltage of the generator 10 to a value below its regulated value decreases the magnitude of the current flow through the control windings 114, 116, 118 and 120. A decrease in the current flow through the control windings 114, 116, 118 and 120 unbalances the push-pull magnetic amplifier 32 in such a direction that the output current from the section 46 of the amplifier 32 increases and the output current from the section 48 decreases. Such an action increases the magnitude of the current flow through the boost field winding 28 of the exciter 20 and decreases the magnitude of the current flow through the buck field winding 26. This in turn increases the magnitude of the output voltage of the exciter 20 as well as the magnitude of the voltage across the field winding 12 of the generator 10 to thereby return the magnitude of the output voltage of the generator 10 to its regulated value.

The first damping circuit 160 comprises a transformer 163 and the variable resistors 166 and 168. The primary winding 162 is responsive to changes in the voltage across the field winding 12 of the generator 10, the primary winding being connected in series circuit relationship with the variable resistor 168 across the field winding 12. The secondary winding 164 of the transformer 163 is connected in series circuit relationship with the variable resistor 166, the series circuit being connected across the output terminals 165 and 167 of the damping circuit 160. As previously described, the damping windings 142, 144, 146 and 148 of the magnetic amplifier 32 are connected in series circuit relationship across the output terminals 165 and 167 of the damping circuit 160.

In general, the first damping circuit 160 operates to provide a damping signal at its output terminals 165 and 167 which varies with the derivative of the voltage across the field winding 12 of the generator 10. Whenever the voltage across the field winding 12 changes, a voltage is induced in the secondary winding 164 of the transformer 163 which is proportional to the derivative of the voltage across the field winding 12. The variable resistors 166 and 168 are provided in order to vary the magnitude and time delay of the damping signal which appears at the output terminals 165 and 167 of the damping circuit 160.

The second damping circuit 170 comprises a current transformer 172, a variable resistor 174 and a reactor 176. The secondary winding of the current transformer 172 is responsive to changes in the excitation current which flows through the conductor 21 to the field winding 12 of the generator 10. The secondary winding of the current transformer 172 is connected in series circuit relationship with the variable resistor 174 and the reactor 176, the series circuit being connected across the output terminals 173 and 175 of the second damping circuit 170. As previously described, the damping windings 130, 132, 134 and 136 are connected in series circuit relationship across the output terminals 173 and 175 of the second damping circuit 170.

In general, the second damping circuit 170 operates to provide a damping signal at the output terminals 173 and 175 which varies with the derivative of the excitation field current applied to the field winding 12 of the synchronous generator 10. The damping signal which appears at the output terminals 173 and 175 of the second damping circuit 170 is of the negative derivative type since the damping signal causes a current to flow in the damping windings 130, 132, 134 and 136 of the magnetic amplifier 32 which produces a flux that opposes the flux produced by current flow in the control windings 114, 116, 118 and 120. The flux produced by current flow in the control windings 114, 116, 118 and 120 causes the change in the excitation field current that produces the damping signal at the output terminals 173 and 175 of the second damping circuit 170.

The derivation of the value of the damping signal current which appears at the output terminals 173 and 175 of the second damping circuit 170 is as follows: It is assumed that the resistance of the damping windings 130, 132, 134 and 136 of the magnetic amplifier 32 is negligible. The following terminology is employed.

$R_d$ = the resistance of the variable resistor 174.
$I_d$ = damping signal current flowing in the damping circuit 170.
$L_d$ = the inductance of the reactor 176.
$I_f$ = the excitation field current of the synchronous generator 10.
$M$ = the mutual inductance between the current transformer 172 and the conductor 21 which connects the field winding 12 to the terminal 25.
$E$ = the output voltage across the current transformer 172.
$p$ = the derivative of a quantity with respect to time.

By inspection it follows from the illustrated damping circuit 170 that (1) $$E = M \frac{dI_f}{dt}$$

and that (2) $$E = R_d I_d + L_d \frac{dI_f}{dt}$$

By substituting the value of E obtained in Equation 1 in Equation 2 and using operational notation we obtain (3) $$MpI_f = R_d I_d + L_d p I_f$$

Solving Equation 3 for $I_d$ we obtain (4) $$I_d = \frac{MpI_f}{R_d + L_d p I_f} = \frac{p\frac{M}{R_d}}{1 + \frac{L_d}{pR_d}} I_f$$

Referring to Equation 4, the damping signal current $I_d$ at the output terminals 173 and 175 of the damping circuit 170 is proportional to the derivative of the excitation field current $I_f$ of the synchronous generator 10. The magnitude of the damping signal current $I_d$ is determined by the mutual inductance M and the resistance $R_d$ of the variable resistor 174. The time delay introduced into the damping signal by the damping circuit 170 is determined by the inductance $L_d$ of the reactor 176 and the resistance $R_d$ of the variable resistor 174. As previously stated, the damping windings 130, 132, 134 and 136 are so disposed on the respective core members 50, 52, 54 and 56 that an increasing field current causes a damping signal current $I_d$ to flow which reduces the voltage across the field winding 12 of the generator 10.

Figure 2:
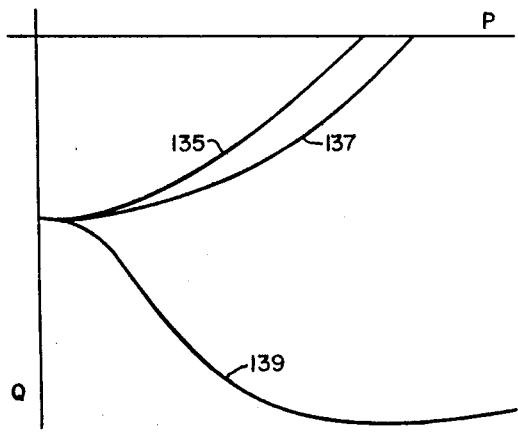
FIG. 2 is a graph illustrating the operation of the regulator system shown in FIG. 1.

Referring to FIG. 2 of the drawing, the effect of the damping circuits 160 and 170 on the operation of the regulator loop 30 is illustrated. Using the conventional representation, the horizontal axis P indicates the real power and the vertical axis Q represents the leading reactive power being handled by the synchronous generator 10. The curve 135 defines the typical limits of static stability of a synchronous machine based on operation without an automatic voltage regulator. The curve 137 indicates approximately where hunting of a synchronous generator would begin, based on automatic operation with a conventional, continuously acting regulator. The curve 139 indicates typical pull out and dynamic limits of operation based on the use of a regulator incorporating the teachings of this invention. As previously stated, when the proper components are selected for the damping circuits 160 and 170, hunting of the synchronous generator 10 is substantially eliminated over the entire range of dynamic stability as indicated by the curve 139.

Figure 3:
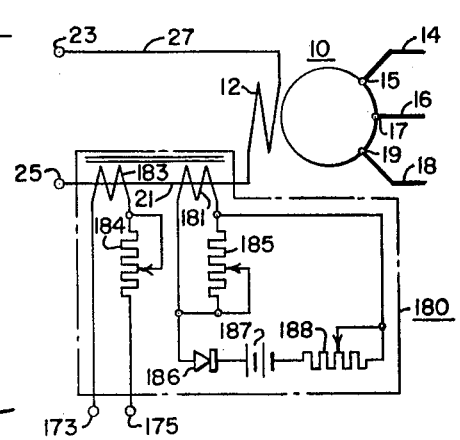
FIG. 3 is a partial schematic diagram of circuits and apparatus illustrating a second embodiment of this invention.

Referring to FIG. 1, the regulator system disclosed satisfactorily controls hunting of the synchronous generator 10 during normal steady-state operation. In the event of a fault on the power system connected to the line conductors 14, 16 and 18, however, the positive induced current in the field winding 12 tends to cause a large damping signal at the output of the damping circuit 170 which results in reduced excitation current being applied to the field winding 12 at a time when the highest excitation current obtainable is necessary in order to maintain the transient stability of the synchronous generator 10. Therefore, in order to limit the damping signal which varies with the derivative of the excitation field current, the damping circuit 180 illustrated in FIG. 3 may be substituted for the damping circuit 170 shown in FIG. 1. In general, the damping circuit 180 is connected to provide a damping signal at the terminals 173 and 175 which varies with the derivative of the excitation current applied to the field winding 12 of the generator 10 but which limits the magnitude of the damping signal at the terminals 173 and 175 when a fault occurs in the power system connected to the line conductors 14, 16 and 18. The damping circuit 180 comprises two current transformer windings 181 and 183 disposed on a common magnetic core. The current transformer winding 183 is responsive to changes in the excitation current applied to the winding 12 of the generator 10 and is connected in series circuit relationship with the variable resistor 184 across the terminals 173 and 175. The damping windings 130, 132, 134 and 136 would be connected as shown in FIG. 1 in series circuit relationship across the terminals 173 and 175. The current transformer winding 181 is also responsive to changes in the excitation current applied to the field winding 12. The variable resistor 185 is connected across the current transformer winding 181.

A unidirectionally conducting device, specifically a diode 186, is connected in series circuit relationship with a direct current bias source 187 and a variable resistor 188, the series circuit being connected in parallel circuit relationship with the variable resistor 185 and in parallel circuit relationship with the current transformer winding 181.

In operation, the damping circuit 180 operates similarly to the damping circuit 170 for small changes in the excitation current applied to the field winding 12 of the generator 10. In the damping circuit 180, however, the time delay is provided by the current which circulates in the current transformer winding 181. The value of the damping signal current provided by the damping circuit 180 for small rates of change in the excitation current applied to the field winding 12 of the generator 10 at the terminals 173 and 175, which may be derived by conventional circuit theory similarly to that of the damping circuit 170, is $$\frac{pT_1}{1+pT_2}I_f$$

where $T_1$ is the mutual inductance between the winding 183 and the conductor 21, which carries the excitation field current $I_f$ to the field winding 12, divided by the resistance of the variable resistor 184 and $T_2$ is the sum of the time constants of both the current transformer windings 181 and 183. It will be seen therefore that the damping signal current provided by the damping circuit 180 for small changes in the excitation field current $I_f$ applied to the field winding 12 of the generator 10 is proportional to the derivative of the excitation field current $I_f$. The magnitude and time delay of the damping signal applied at the terminals 173 and 175 by the damping circuit 180 may be varied by adjusting the resistors 184 and 185. For small rates of change of the excitation current applied to the field winding 12 as would normally be encountered in hunting of the generator 10, the voltage induced across the current transformer winding 181 would be less than the bias voltage introduced by the direct current source 187. The diode 186 would therefore not conduct for small rates of change of the excitation current applied to the field winding 12.

For large rates of change in the excitation current which flows to the field winding 12 through the conductor 21, such as would occur when a fault was present in the power system connected to the line conductors 14, 16 and 18, the voltage induced across the current transformer winding 181 would be larger than the bias voltage introduced by the direct current source 187. The diode 186 would then conduct, thus causing a very low resistance to be reflected into the current transformer winding 183 and preventing a large damping signal current from being applied at the terminals 173 and 175 by the damping circuit 180. Thus, the exciter voltage would not be reduced by the action of the damping circuit 180 when a fault occurs in the power system connected to the line conductors 14, 16 and 18 and a large induced current results in the field winding 12 of the generator 10. In summary, the damping circuit 180 operates to limit the damping signal at the terminals 173 and 175 during periods when the field current is rapidly rising, while a rapidly falling field current may still produce a large damping signal at the terminals 173 and 175 to obtain maximum stability of the synchronous generator 10. It is to be understood that the direct current source 187 may be replaced with a rectified alternating current voltage. It is also to be understood that the bias source 187 may be replaced by a non-linear resistance element, such as that known commercially as Thyrite, connected in series circuit relationship with the diode 186.

Figure 4:
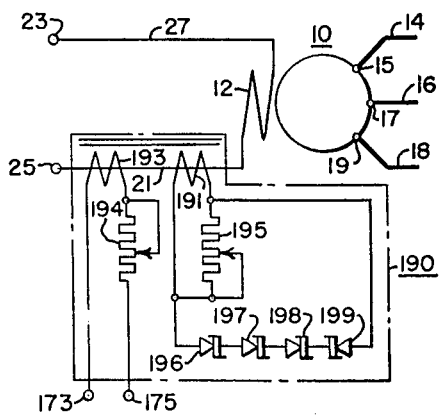
FIG. 4 is a partial schematic diagram of circuits and apparatus illustrating a third embodiment of this invention.

Referring to FIG. 4, there is illustrated another damping circuit 190 which may be substituted for the damping circuit 170 illustrated in FIG. 1. In general, the damping circuit 190 is similar to the damping circuit 180 except for the means employed to limit the damping signal applied to the damping windings 130, 132, 134 and 136 of the magnetic amplifier 32. The damping circuit 190 includes two current transformer windings 191 and 193 disposed on a common magnetic core. The current transformer windings 191 and 193 are both responsive to changes in the excitation current applied to the field winding 12 of the generator 10, the windings 191 and 193 being equivalent to the windings 181 and 183 of the damping circuit 180. The variable resistor 194 is connected in series circuit relationship with the current transformer winding 193, the series circuit being connected across the terminals 173 and 175. The output damping signal of the circuit 190 appears at the terminals 173 and 175 and is applied to the damping windings 130, 132, 134 and 136 which are connected in series circuit relationship across the terminals 173 and 175. The variable resistor 195 is equivalent to the variable resistor 185 of the damping circuit 180 and is connected across the current transformer winding 191. The semiconductor diodes 196, 197, 198 and 199 are connected in series circuit relationship across the current transformer winding 191, the semiconductor diode 199 being connected to conduct current in a direction opposite to that of the semiconductor diodes 196, 197 and 198. The diodes 196, 197, 198 and 199 are preferably of the type known to the art as Zener diodes. The diode 199 breaks down for a voltage of one polarity and the diodes 196, 197 and 198 would break down for a voltage of the opposite polarity having a magnitude of approximately three times the breakdown voltage of the diode 199.

In general, the operation of the damping circuit 190 would be similar to that of the damping circuit 180 in that the damping circuit 190 provides a damping signal at the terminals 173 and 175 which is proportional to the derivative of the excitation current applied to the field winding 12 of the generator 10 for small rates of change in the excitation current. For large rates of change of the excitation current applied to the field winding 12, however, the diode 199 will break down for a voltage of one polarity and the diodes 196, 197 and 198 will break down for a voltage of the opposite polarity having a larger magnitude. The damping circuit 190 is arranged so that when a fault occurs on the power system connected to the line conductors 14, 16 and 18, the semiconductor 199 will break down and a low resistance will be reflected into the current transformer winding 193, thus limiting the damping signal at the terminals 173 and 175 which would result in reducing the exciter voltage across the field winding 12 of the generator 10. On the other hand, if the excitation current were rapidly falling, the semiconductor diodes 196, 197 and 198 would permit a much larger damping signal to be applied to the damping windings 130, 132, 134 and 136 before breaking down and limiting the damping signal. In summary, the damping circuit 190 like the damping circuit 180, operates to limit the damping signal applied to the magnetic amplifier 32 during fault conditions so that the excitation current applied to the field winding 12 will not be further reduced by the action of the damping circuit when maximum excitation current is necessary to maintain transient stability. The damping circuit 190 allows a much larger damping signal to develop at the terminals 173 and 175 during periods of rapidly falling excitation current than when a fault occurs on the power system connected to the line conductors 14, 16 and 18.

Figure 5:
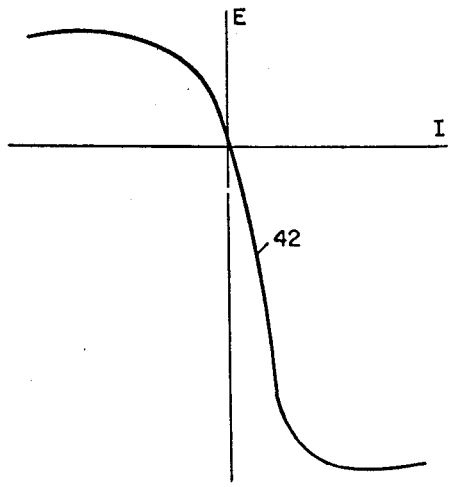
FIG. 5 is a graph illustrating the limiting action of the damping circuit illustrated in FIG. 4.

Referring to FIG. 5, the limiting action of the damping circuit 190 is illustrated by the curve 42, which illustrates the volt ampere characteristics of the diodes 196, 197, 198 and 199 connected in series circuit relationship. The portion of the curve 42 to the left of the vertical voltage axis illustrates the breakdown voltage of the diode 199 when a fault occurs on the power system connected to the line conductors 14, 16 and 18. The portion of the curve 42 to the right of the vertical voltage axis illustrates the larger breakdown voltage of the diodes 196, 197 and 198 connected in series circuit relationship.

Referring to FIG. 6, there is illustrated a damping circuit 200 which may be substituted for the damping circuit 170 illustrated in FIG. 1. As previously mentioned, a damping signal which varies with the derivative of the direct axis component of the armature current of the synchronous generator 10 may also be used to prevent hunting of the synchronous generator 10. In general, the damping circuit 200 is connected across the output of the synchronous generator 10 to obtain a damping signal which is proportional to the derivative of the direct axis component of the generator armature current. The damping circuit 200 comprises an alternating current controlled magnetic amplifier 210.

Referring to FIG. 7, the terminal voltage and the armature current of the synchronous generator 10 are represented by the vectors $e_t$ and $i$ respectively. The voltage behind the synchronous reactance of the generator 10 is represented by the vector $e_d$ which is the vector sum of the terminal voltage $e_t$ and the synchronous reactance voltage drop $ix_d$. The excitation field current applied to the field winding 12 of the synchronous generator 10 is represented by the vector $I_f$. The quadrature axis component and the direct axis component of the generator armature current are represented by the vectors $i_q$ and $i_d$, respectively. The direct axis component $i_d$ of the generator armature current $i$ is equal to $i$ cosine $\theta$, where $\theta$ is the phase angle between $i$ and $i_d$.

In order to obtain a voltage proportional to the direct axis component $i_d$ of the generator armature current $i$, the load windings 248 and 250 of the magnetic amplifier 210 are responsive to a voltage which is proportional to the voltage $e_d$ behind the synchronous reactance $x_d$ of the generator 10. The control windings 258 and 260 of the magnetic amplifier 210 are arranged to be responsive to the generator armature current $i$. It has been found that the output voltage of an alternating current controlled magnetic amplifier is proportional to the magnitude of the alternating current flowing through its alternating current control windings times the cosine of the angle between its supply voltage and the alternating current flowing through its alternating current control windings. In general, the magnetic amplifier 210 is rendered responsive to the generator armature current $i$ and to a supply voltage displaced from the generator armature current $i$ by the angle $\theta$. Therefore the output voltage of the load windings 248 and 250 of the magnetic amplifier 210 is proportional to the armature current $i$ times cosine $\theta$ or to the direct axis component $i_d$ of the armature current $i$.

In particular, the magnetic amplifier 210 includes the magnetic core members 236 and 238. The load windings 248 and 250 are disposed in inductive relationship with the core members 236 and 238, respectively. Self-saturation of the magnetic amplifier 210 is obtained by connecting in series circuit relationship with the load windings 248 and 250, the self-saturating rectifiers 233 and 235, respectively. In order to form a doubler circuit, the series circuit including the load winding 248 and the self-saturating rectifier 233, is connected in parallel circuit relationship with the series circuit including the load winding 250 and the self-saturating rectifier 235.

In order to provide the proper magnitude of voltage for the load windings 248 and 250, the transformer 230 having a primary winding 232 and a secondary winding 234 is provided. As illustrated, the primary winding 232 is connected across the series circuit including the variable resistor 228 and the secondary winding 224 of the potential transformer 220. The primary winding 222 of the potential transformer 220 is responsive to the output voltage of the synchronous generator at the line conductors 14 and 18. The current transformer 226 is provided to circulate a current through the variable resistor 228 which is proportional to the armature current $i$ in the line conductor 16. The output voltage of the load windings 248 and 250 appears across the variable resistor 242 which is connected in series circuit relationship between the secondary winding 234 and the load windings 248 and 250 which are connected in parallel circuit relationship. The control windings 258 and 260 are disposed in inductive relationship with the core members 236 and 238, respectively, and are responsive to the generator armature current $i$ in the line conductor 16, being connected in parallel circuit relationship with the variable resistor 228 across the output of the current transformer 226.

For the purpose of biasing the magnetic amplifier 210 to approximately half output, the biasing windings 244 and 246 are disposed in inductive relationship with the magnetic core members 236 and 238, respectively. As illustrated, the biasing windings 244 and 246 are connected in series circuit relationship with one another and with a variable resistor 249, the series circuit being connected across a direct current source 299. Each of the biasing windings 244 and 246 is so disposed with respect to its respective load windings 248 and 250 that the current flow through the biasing windings 244 and 246 produces a flux in the respective core members 236 and 238 that opposes the flux produced by the current flow through the respective load windings 248 and 250, respectively.

The auxiliary output windings 254 and 256 are disposed in inductive relationship with the magnetic core members 236 and 238, respectively. The auxiliary output windings 254 and 256 are connected in series circuit relationship with each other and with the variable resistor 272 and the reactor 274, the series circuit being connected across the output terminals 173 and 175 of the damping circuit 200. The terminals 173 and 175 are connected to the damping windings 130, 132, 134 and 136 of the magnetic amplifier 32, which are connected in series circuit relationship across the terminals 173 and 175. The current which flows in the auxiliary output windings 254 and 256 is substantially proportional to the derivative of the current which flows in the load windings 248 and 250.

In the operation of the damping circuit 200, the supply voltage which is applied to the load windings 248 and 250 of the magnetic amplifier 210 includes two components. The first component of the supply voltage is obtained across the secondary winding 224 of the potential transformer 220 and is a voltage which is proportional in magnitude to the terminal voltage $e_t$ shown in FIG. 7, but displaced in phase relationship by 90°. The second component of the supply voltage applied to the load windings 248 and 250 is obtained across the variable resistor 228 which is adjusted to be proportional to the synchronous reactance $X_d$ of the generator 10. The current which circulates through the variable resistor 228 from the current transformer 226 is in such phase relationship with the voltage across the secondary winding 224 of the transformer 220 that the vector sum of the voltage across the variable resistor 228 and the voltage across the secondary winding 224 is proportional in magnitude to the voltage $e_d$ behind the synchronous reactance of the generator 10 but displaced in phase relationship by 90° so that the supply voltage applied to the load windings 248 and 250 is substantially in phase with the direct axis component $i_d$ of the armature current $i$. Therefore, the phase angle between the supply voltage applied to the load windings 248 and 250 and the current which flows in the control windings 258 and 260 is equal to $\theta$. The current which flows in the load windings 248 and 250 is proportional to $i$ cosine $\theta$ or to the direct axis component $i_d$ of the armature current $i$. As previously discussed, the output voltage across the variable resistor 242 is therefore proportional to the current applied to the alternating-current control windings 258 and 260 times the cosine of the angle between the current applied the alternating current control windings 258 and 260 and the supply voltage applied to the load windings 248 and 250. Due to the mutual inductance between the load windings 248 and 250 and the auxiliary output windings 254 and 256, the current which flows in the auxiliary output windings 254 and 256 will be proportional to the derivative of the current flowing in the load windings 248 and 250 which is equal to $i$ cosine $\theta$ or to the derivative of the direct axis component $i_d$ of the generator armature current $i$. In a manner similar to the damping circuit 170, the variable resistor 272 and the reactor 274 are provided in order to determine the time delay associated with the damping signal at the terminals 173 and 175, at the output of the damping circuit 200.

Referring to FIG. 8, a damping circuit 300 is illustrated which may be substituted for the damping circuit 170 shown in FIG. 1. In general, the damping signal obtained at the terminals 173 and 175 from the damping circuit 300 is proportional to a combination of the derivatives of the excitation field current applied to the field winding 12 and the direct axis component of the generator armature current.

The damping circuit 300 includes the voltage dividing resistors 202 and 204 and the variable resistor 206. The variable resistor 206 is connected in series circuit relationship with the field winding 12. The fixed resistors 202 and 204 are connected in series circuit relationship, the series circuit being connected across the field winding 12 at the conductors 21 and 27. The output of the damping circuit 300 is taken between the resistors 202 and 204 at the terminal 203 which is connected to the terminal 173 and at the terminal 175 between the field winding 12 and the variable resistor 206.

In the operation of the damping circuit 300, a damping signal is obtained which is proportional to the difference between the voltage across the field winding 12 and the voltage drop due to the excitation field current flowing through the resistance of the field winding 12. The voltage across the resistor 204 is proportional to the voltage across the field winding 12. The variable resistor 206 is adjusted to have a resistance proportional to the resistance of the field winding 12. The excitation current flowing through the variable resistor 206 produces a voltage drop which is proportional to the voltage drop across the resistance of the field winding 12 due to the excitation field current. The voltages across the resistor 204 and the variable resistor 206 are opposing and the net difference between the two voltages appears at the terminals 173 and 175.

The derivation of the damping signal current supplied from the damping circuit 300 at the terminals 173 and 175 is as follows: It is assumed that the relationship between the voltages and currents and flux linkages relating to the field winding 12 of the generator 10 will be as stated in Equations 68 and 78, in an article entitled "Fundamental Equations for Analogue Studies of Synchronous Machines" by D. B. Breedon and R. W. Ferguson, on page 302 of the A.I.E.E. Transactions, volume 75, part III, No. 24, June 1956. It is also assumed that the current $i_{sd}$ flowing in the subtransient path of the field winding 12 is negligible. The following terminology is employed.

$Ex$ = the exciter terminal voltage across the field winding 12.
$i_{fd}$ = the field current of synchronous generator 10.
$R_{fd}$ = the resistance of the generator field winding 12.
$p$ = the derivative with respect to time.
$\lambda_{fd}$ = the field flux linkages.
$L_{ffd}$ = the self inductance of the generator field winding 12.
$i_{sd}$ = the current in the direct-axis subtransient path of the field winding 12.
$L_{fsd}$ = the mutual inductance between the field winding 12 and the subtransient path.
$L_{fad}$ = the mutual inductance between the phase $a$, armature current and the field winding 12 of the generator 10.
$i_d$ = the direct axis component of the armature current of the synchronous generator 10.

As derived in the above magazine article, (1) $$Ex = i_{fd}R_{fd} + p\lambda_{fd}$$

and (2) $$\lambda_{fd} = i_{fd}L_{ffd} + i_{sd}L_{fsd} - \tfrac{3}{2}L_{fad}i_d$$

Assuming $i_{sd}$ is negligible and by substituting the value of $\lambda_{fd}$ obtained from Equation 2 in Equation 1 and transposing $i_{fd}R_{fd}$, we obtain (3) $$Ex - i_t R_{fd} = p(i_{fd}L_{ffd} - \tfrac{3}{2}L_{fad}i_d)$$

Referring to Equation (3), it will be seen that the difference between the voltage across the field winding 12 and the voltage drop $i_t R_{fd}$ due to the resistance of the field winding 12 will be proportional to the derivative of the excitation field current $i_{fd}$ and the direct axis component $i_d$ of the generator armature current.

It is to be understood that the damping circuits disclosed are applicable to all types of continuously acting regulators as well as the magnetic amplifier type regulator used to illustrate this invention.

The apparatus embodying the teachings of this invention has several advantages, for instance, the damping circuits disclosed comprise static components and thus require a minimum of maintenance. In addition, the damping circuits disclosed can be used to substantially eliminate hunting over the entire range of dynamic stability of a synchronous machine. This means that greater advantage may be taken of the capacity of a synchronous machine in the regions of loading when the field of the synchronous machine is weakened, such as when the load of the synchronous generator includes a leading power factor component as well as a real power component. The damping circuits disclosed also include means for preventing the damping circuit from reducing the voltage across the field winding of the synchronous generator when fault conditions are present at the output of the synchronous machine.

Since numerous changes may be made in the above described apparatus and circuit and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A regulating system for a dynamoelectric machine having an excitation field winding and output terminals comprising first means connected in circuit relation with said output terminals for obtaining a measure of the output terminal voltage of said machine, second means connected in circuit relation with said field winding and said first means for controlling the excitation current supplied to said field winding in accordance with the measure of said output terminal voltage to maintain said terminal voltage at substantially a predetermined value, a damping circuit connected in circuit relation with said machine for obtaining a damping signal which varies with the direct axis component of the output current of said machine and third means for applying said damping signal to said second means to prevent hunting of said regulating system.

2. In a regulating system for a synchronous generator having an excitation field winding and output terminals, the combination comprising first means for obtaining a measure of the output terminal voltage of said generator, second means for controlling the excitation current applied to said excitation winding in accordance with said measure of said output terminal voltage to maintain said terminal voltage at substantially a predetermined value, a damping circuit for obtaining a damping signal which varies with the derivative of the direct axis component of the output current of said generator, said damping circuit comprising an alternating current controlled magnetic amplifier connected in circuit relation with the output terminals of said generator, and third means for applying said damping signal to said second means to prevent hunting of said regulating system.

3. In a regulating system for a dynamoelectric machine having an excitation field winding and output terminals, the combination comprising first means for obtaining a measure of the output terminal voltage of said dynamoelectric machine, second means for controlling the excitation current applied to said excitation winding in accordance with said measure of said output terminal voltage to maintain said terminal voltage at substantially a predetermined value, a damping circuit for obtaining a damping signal which varies with the derivative of the direct axis component of the output current of said dynamoelectric machine, said damping circuit comprising an alternating current controlled magnetic amplifier connected in circuit relationship with said output terminals of said dynamoelectric machine, and output windings for said magnetic amplifier connected to said second means to prevent hunting of said regulating system.

4. In a regulating system for a dynamoelectric machine having an excitation field winding and output terminals, the combination comprising first means for obtaining a measure of the output terminal voltage of said dynamoelectric machine, second means for providing a reference voltage, third means for comparing said measure of said output terminal voltage with said reference voltage, fourth means for controlling said excitation field winding in accordance with the larger of said compared voltages to maintain said terminal voltage at substantially a predetermined value, a damping circuit for obtaining a damping signal which varies with the derivative of the direct axis component of the output current of said dynamoelectric machine, and fifth means for applying said damping signal to said fourth means to prevent hunting of said regulating system.

5. In a regulating system for a dynamoelectric machine having an excitation field winding and output terminals, the combination comprising a sensing circuit for obtaining a measure of the output voltage of said dynamoelectric machine, first means for providing a reference voltage, a magnetic amplifier connected to said sensing circuit and said first means and responsive to the difference between said measure of said output voltage and said reference voltage for controlling the excitation current applied to said excitation winding to maintain the output voltage of said dynamoelectric machine at substantially a predetermined value, damping windings for said magnetic amplifier, a damping circuit for obtaining a damping signal which varies with the derivative of the direct axis component of the output current of said dynamoelectric machine, said damping circuit being connected in circuit relationship with said damping windings of said magnetic amplifier.

References Cited in the file of this patent
UNITED STATES PATENTS
2,925,550     Holson _____ Feb. 16, 1960